(12) United States Patent
Ivry (10) Patent No.: US 10,887,077 B1
(45) Date of Patent: Jan. 5, 2021

(54) METHOD AND APPARATUS FOR A ONE BIT PER SYMBOL TIMING RECOVERY PHASE DETECTOR

(71) Applicant: Mellanox Technologies, Ltd., Yokneam (IL)

(72) Inventor: Raanan Ivry, Kesaria (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 16/511,746

(22) Filed: Jul. 15, 2019

(51) Int. Cl.
*H04W 52/02* (2009.01)
*H04L 7/00* (2006.01)
*H04L 25/49* (2006.01)
*G11B 20/10* (2006.01)

(52) U.S. Cl.
CPC ........ *H04L 7/0029* (2013.01); *H04L 25/4917* (2013.01); *G11B 20/10037* (2013.01); *H04W 52/0235* (2013.01)

(58) Field of Classification Search
USPC .......................... 375/268, 327, 353; 327/156
See application file for complete search history.

(56) References Cited

U.S. PATENT DOCUMENTS

| | | | | |
|---|---|---|---|---|
| 5,760,653 A * | 6/1998 | Soda | ...................... | H03L 7/091 327/156 |
| 6,545,532 B1 * | 4/2003 | Maalej | ................. | H04L 1/0057 329/304 |
| 9,251,811 B1 * | 2/2016 | Furrer | ...................... | G11B 5/02 |
| 2003/0086195 A1 * | 5/2003 | Ashley | ..................... | G11B 5/09 360/46 |
| 2006/0250170 A1 * | 11/2006 | Wang | ........................ | H03L 7/07 327/156 |
| 2007/0035867 A1 * | 2/2007 | Higashino | ........ | G11B 20/10009 360/51 |
| 2007/0058764 A1 * | 3/2007 | Cheng | ................... | H04L 7/0334 375/355 |
| 2007/0092040 A1 * | 4/2007 | Higashino | ............. | H04L 7/0029 375/327 |
| 2008/0056403 A1 * | 3/2008 | Wilson | .................. | H04L 7/0029 375/268 |
| 2009/0074127 A1 * | 3/2009 | Liu | ....................... | H03L 7/0991 375/376 |

(Continued)

*Primary Examiner* — Eva Y Puente
(74) *Attorney, Agent, or Firm* — Alston & Bird LLP (57) ABSTRACT

Embodiments are disclosed for timing recovery used in conjunction with a phase detector embedded in a receiver of a communication system. An example method includes receiving, via a receiver of a communication system, an input signal. The input signal encodes a plurality of bits in a number of amplitude levels. The method further includes using an analog to digital converter to generate a sampled signal based on the input signal. The method further includes using a first interpolation filter to filter the sampled signal. The method further includes using a second interpolation filter to filter the sampled signal. The method further includes using a first non-linear device to process an output of the first interpolation filter. The method further includes using a second non-linear device to process an output of the second interpolation filter. The method further includes performing a mathematical operation on an output of the first non-linear device with an output of the second non-linear device to generate phase information.

20 Claims, 7 Drawing Sheets

(56) References Cited

U.S. PATENT DOCUMENTS

| | | | | |
|---|---|---|---|---|
| 2011/0002364 A1* | 1/2011 | Michaels | ............... | H04B 1/707 375/141 |
| 2011/0311008 A1* | 12/2011 | Slezak | .................... | H03M 9/00 375/353 |
| 2016/0344540 A1* | 11/2016 | Derras | .................... | H04L 7/048 |

\* cited by examiner

METHOD AND APPARATUS FOR A ONE BIT PER SYMBOL TIMING RECOVERY PHASE DETECTOR

TECHNOLOGICAL FIELD

Embodiments of the present invention relate generally to a method and apparatus for a one bit per symbol timing recovery phase detector in communication systems.

BACKGROUND

The present invention relates to a method and apparatus for a timing recovery phase detector in a receiver for pulse amplitude modulation ("PAM") signals or others. Communication systems are generally composed of a transmitter, a receiver, and a channel. The transmitter generates a signal conveying information, which, after being transmitted over a channel, is received and recovered at the receiver. Information in the form of symbols embedded in the signal are set by the transmitter, and the symbol frequency, symbol phase, and symbol timing that may be recovered by the receiver. In the real world, transmission channels are non-ideal and introduce various unwanted effects that cause distortion of the signals. Therefore, in order to recover the information transmitted in the signal, the receiver needs to accurately recover the symbol frequency, symbol phase, and symbol timing of the received signal so that it is synchronous with the transmitted signal and will decrease the symbol error probability while detecting the symbols.

BRIEF SUMMARY

Example embodiments described herein disclose a method and apparatus for a one bit per symbol timing recovery phase detector in a receiver of a communication systems. The details of some embodiments described in this specification are set forth in the accompanying drawings and the description below. Other features, aspects, and advantages of the subject matter will become apparent from the description, the drawings, and the claims.

In accordance with an example embodiment, a method for timing recovery used in conjunction with a phase detector embedded in a receiver of a communication system is provided. The method includes receiving, via a receiver of a communication system, an input signal. The input signal encodes a plurality of bits in a number of amplitude levels. The method further includes using an analog to digital converter to generate a sampled signal based on the input signal. The analog to digital converter is configured to receive the input signal and a waveform from a numerical control oscillator. The method further includes using a set of interpolation filters to restore the input signal in one or more sampling points to generate a restored signal. The method further includes determining phase information of the input signal by using a phase detector on the sampled signal and the restored signal based on one or more original sampling points of the analog to digital converter and the one or more sampling points. The method further includes outputting the phase information for further processing to recover a timing phase of the input signal.

In another example embodiment, another method for timing recovery used in conjunction with a phase detector embedded in a receiver of a communication system is provided. The method includes receiving, via a receiver of a communication system, an input signal. The input signal encodes a plurality of bits in a number of amplitude levels. The method further includes using an analog to digital converter to generate a sampled signal based on the input signal. The analog to digital converter is configured to receive the input signal and a waveform from a numerical control oscillator. The method further includes using a first interpolation filter to filter the sampled signal. The method further includes using a second interpolation filter to filter the sampled signal. The method further includes using a first non-linear device to process an output of the first interpolation filter. The method further includes using a second non-linear device to process an output of the second interpolation filter. The method further includes performing a mathematical operation on an output of the first non-linear device with an output of the second non-linear device to generate phase information. The method further includes outputting the phase information for further processing to generate the waveform.

In some embodiments, the input signal is one of a pulse amplitude modulation signal, a quadrature amplitude modulation signal, or other signal encoding the plurality of symbols in four amplitude levels. In some embodiments, the first interpolation filter is a finite impulse response filter and the second interpolation filter is a four taps finite impulse response filter. In some embodiments, the first interpolation filter is an infinite impulse response filter and the second interpolation filter is an infinite impulse response filter. In some embodiments, the input signal is a sampled signal previously sampled from an original signal at a pre-defined symbol rate. In some embodiments, the first non-linear device is configured to calculate an absolute value, and wherein the second non-linear device is configured to calculate an absolute value. In some embodiments, the first non-linear device is configured to calculate a square root and the second non-linear device is configured to calculate a square root. In some embodiments, the mathematical operation is one of: a subtraction operation or an interpolation.

In accordance with another example embodiment, an apparatus for timing recovery used in conjunction with a phase detector embedded in a receiver of a communication system is provided. The apparatus comprises a receiver of a communication system configured to receive an input signal. The apparatus further comprises an analog to digital converter configured to generate a sampled signal based on the input signal and to receive a waveform from a numerical control oscillator. The apparatus further comprises a first interpolation filter configured to filter the sampled signal. The apparatus further comprises a second interpolation filter configured to filter the sampled signal. The apparatus further comprises a first non-linear device configured to process an output of the first interpolation filter. The apparatus further comprises a second non-linear device configured to process an output of the second interpolation filter. The apparatus further comprises a mathematical operation performing module configured to perform a mathematical operation on an output of the first non-linear device with the output of the second non-linear device to generate phase information for further processing to generate the waveform.

In some embodiments, the apparatus further comprises a loop filter configured to filter the phase information and the numerical control oscillator configured to generate the waveform based on an output of the loop filter.

In some embodiments, the input signal is one of a pulse amplitude modulation signal, a quadrature amplitude modulation signal, or other signal encoding the plurality of symbols in four amplitude levels. In some embodiments, the first interpolation filter is a finite impulse response filter and the second interpolation filter is a four taps finite impulse response filter. In some embodiments, the first interpolation filter is an infinite impulse response filter and the second interpolation filter is an infinite impulse response filter. In some embodiments, the input signal is a sampled signal previously sampled from an original signal at a pre-defined symbol rate. In some embodiments, the first non-linear device is configured to calculate an absolute value, and wherein the second non-linear device is configured to calculate an absolute value. In some embodiments, the first non-linear device is configured to calculate a square root and the second non-linear device is configured to calculate a square root. In some embodiments, the mathematical operation is one of: a subtraction operation or an interpolation.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all, embodiments are shown. Indeed, the embodiments may take many different forms with a general structure shown in FIG. 5 and should not be construed as limited to the embodiments set forth herein; rather, these embodiments are provided so that this disclosure will satisfy applicable legal requirements. Like reference numerals refer to like elements throughout. The terms "exemplary" and "example," as may be used herein, are not provided to convey any qualitative assessment, but instead merely to convey an illustration of an example. Thus, use of any such terms should not be taken to limit the spirit and scope of embodiments of the present invention.

The present invention relates to a method and apparatus for a timing recovery phase detector in a receiver for pulse amplitude modulation ("PAM"), quadrature amplitude modulation ("QAM") and any other modulation methods. Communication systems are generally composed of a transmitter, a receiver, and a channel. The transmitter generates a modulated signal conveying information, which, after being transmitted over a channel, is received and recovered at the receiver. The symbols carry the information. Information in the form of symbols embedded in the signal are set by the transmitter. The symbol frequency and symbol timing should be recovered by the receiver. In the real world, transmission channels are non-ideal and introduce various unwanted effects that cause distortion and adds noise to the signals. Therefore, in order to recover the information transmitted in the signal, the receiver needs to accurately recover the symbol frequency, and detect the symbol timing phase of each symbol of the received signal so that it is synchronous with the transmitted signal.

For the reasons above, symbol synchronization or timing recovery of received signals is one of the most important functions for a receiver in a communication system. In addition, the transmission channels may cause distortion of the signals, which may include inter-symbol interference ("ISI"). ISI is a form of distortion of a signal in which one symbol interferes with subsequent symbols. The presence of ISI makes the communication less reliable. In addition, the transmission channel may also distort the signal by attenuating higher frequencies more than lower frequencies. Channels may be dispersive, which may disperse a transmitted signal. All of these unwanted effects distort the signal in the transmission process. Therefore, equalization is needed to overcome these unwanted effects and accurately reconstruct the signal.

In high speed communication, sampling at rate that is higher than the symbol rate is often not desired. Sampling at higher than the symbol rate might result in prohibitively large power consumption in high speed communication. Therefore, one bit per symbol timing recovery is desired. In addition, it is desirable that the timing recovery mechanism be independent of the equalization mechanism to prevent interaction between the two mechanisms, which may affect the signal recovery. In order to enable one bit per symbol timing recovery, a one bit per symbol phase detector is needed. One of the best one bit per symbol phase detector known in the field is a Mueller and Muller phase detector. However, performance of the Mueller and Muller phase detector degrades when the channel has a narrower bandwidth and when a higher modulation order, such as PAM-4, is utilized. More than that, Mueller-Muller (MM) requires decisions. Having the decisions required for Mueller-Muller (MM) may cause to long delay, which degrades the performance of the timing recovery. Therefore a better solution is needed. The present invention presents an improved method and apparatus for a one bit per symbol timing recovery phase detector.

Figure 1:
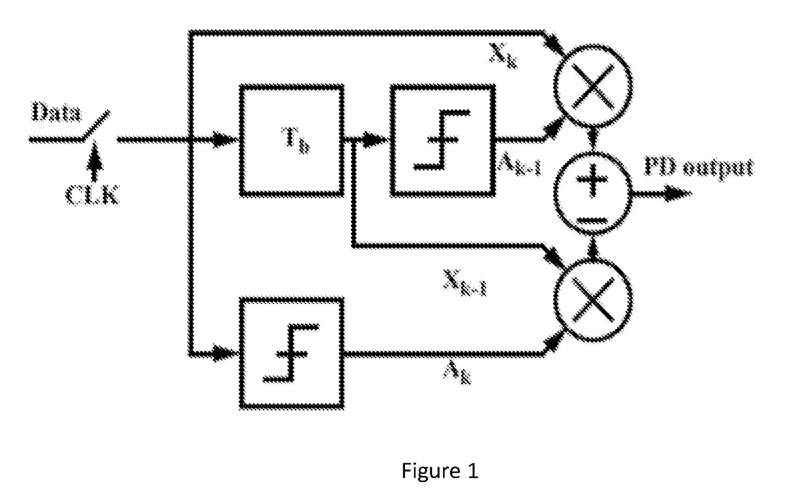
FIG. 1 shows a block diagram of an example Mueller and Muller phase detector.

FIG. 1 shows a block diagram of an example Mueller and Muller phase detector. The purpose of Mueller-Muller (MM) timing recovery is to infer the channel response from baud-rate samples of the received data and then to align the sampling clock to a constant location in each symbol. Denoting the pulse response by h(t) and the symbol interval by $T_b$, the sampling phase $\tau_k$ may be considered centered when $h(\tau_k - T_b) = h(\tau_k + T_b)$. Therefore, the clock will be early when $h(\tau_k - T_b) < h(\tau_k + T_b)$ and it will be late when $h(\tau_k-T_b)>h(\tau_k+T_b)$. Hence, all that is required is an estimate of the difference between $h(\tau_k-T_b)$ and $h(\tau_k+T_b)$. Generally speaking, a Mueller and Muller phase detectors, such as a Baud-rate phase detector, only requires one sample clock per symbol or in other words, one bit per symbol. The performance of Mueller and Muller phase detectors may degrade when the channel has a narrower bandwidth and when a higher modulation order, such as PAM-4, is utilized. Because Mueller and Muller phase detector requires correct decisions for its operation and because the ISI, equalization is used before making the decision, the equalization takes a time and adds delay until the right decision has been determined. This is one major source of degradation when using M & M phase detector.

Figure 2:
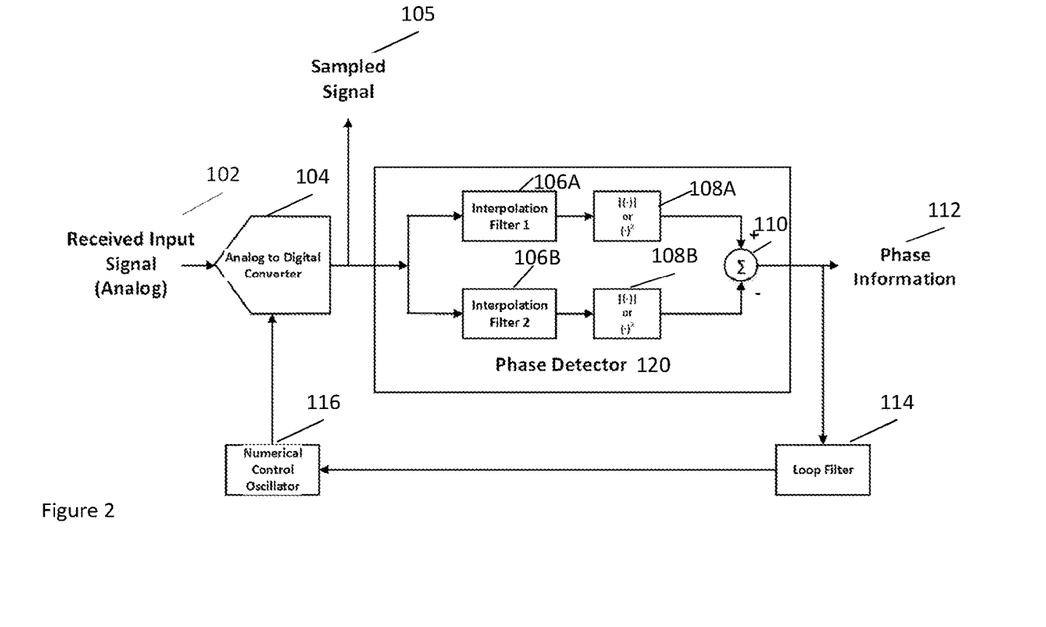
FIG. 2 shows a block diagram of a timing recovery system in a receiver of a communication system according to example embodiments of the present invention.

FIG. 2 shows a block diagram of one specific implementation of a timing recovery system in a receiver of a communication system according to example embodiments of the present invention. As illustrated in FIG. 2, the input of the timing recovery system is a received input signal received via the receiver. The input signal may be an analog signal that encodes a plurality of bits in a number of amplitude levels, such as a PAM-4 or a non-return to zero ("NRZ") signal. The input signal is then fed into an analog to digital converter ("ADC") 104 to generate a sampled signal based on the input signal. The ADC 104 may take input from the numerical control oscillator 116, as further explained below. The ADC 104 may generate the sampled signal based on a pre-defined sampling rate. In some embodiments, the pre-defined sampling rate is smaller than the Nyquist rate. In some embodiments, the ADC 104 is configured to sample the input signal around the peak of the waveform in the input signal.

As illustrated at 105, the sampled signal may be outputted to another component of the receiver. The sampled signal may also be fed into a phase detector 120. The phase detector 120 may comprise a first interpolation filter 106A and a second interpolation filter 106B, a first non-linear device 108A and a second non-linear device 108B, and a mathematical operation performing module 110. The first interpolation filter 106A and the second interpolation filter 106B may be configured to filter the sampled signal. The output of the first interpolation filter 106A and the second interpolation filter 106B may be fed into the non-linear devices 108A and 108B, respectively. The filter parameters of the first interpolation filter 106A and the second interpolation filter 106B may be pre-defined. The first non-linear device 108A may be configured to process the output of the first interpolation filter 106A, and the second non-linear device 108B may be configured to process the output of the second interpolation filter 106B. In some embodiments, the nonlinear devices 108A and 108B may be configured to generate absolute values of their respective inputs. In some embodiments, the nonlinear devices 108A and 108B may be configured to generate square roots of their respective input. Other operations may also be performed by the nonlinear devices 108A and 108B. In some embodiments, the operations performed by the nonlinear devices 108A and 108B are identical. In some embodiments, the operations performed by the nonlinear devices 108A and 108B are not identical.

In some embodiments, the first and the second interpolation filters 106A and 106B are finite impulse response filters. In some embodiments, the first and the second interpolation filters 106A and 106B are infinite impulse response filters. In some embodiments, the number of taps, and other parameters, associated with the first and the second interpolation filters 106A and 106B may be configured differently in different embodiments. In some embodiments, the first and the second interpolation filters 106A and 106B are four taps filters.

The outputs of the nonlinear devices 108A and 108B, which may be the absolute values and square roots of the sampled signal in some cases, may be fed into the mathematical operation performing module 110. In some embodiments, the mathematical operation performing module 110 is configured to perform subtraction. The output of the mathematical operation performing module 110 may be outputted as phase information and may also be fed into the loop filter 114. The loop filter 114 may be configured to generate a control signal based on a timing phase error in the phase information generated by the mathematical operation performing module 110. The output of the loop filter may be fed into the numerical control oscillator 116 to control for various parameters, such as frequency and phase, of the numerical control oscillator 116. The numerical control oscillator 116 may be configured to generate a synchronous, clocked, discrete wave form to be fed into the ADC 104. Although FIG. 2 only shows two interpolation filters and two non-linear devices for illustration purposes, more than two interpolation filters and non-linear devices may be used in certain embodiments.

Figure 3:
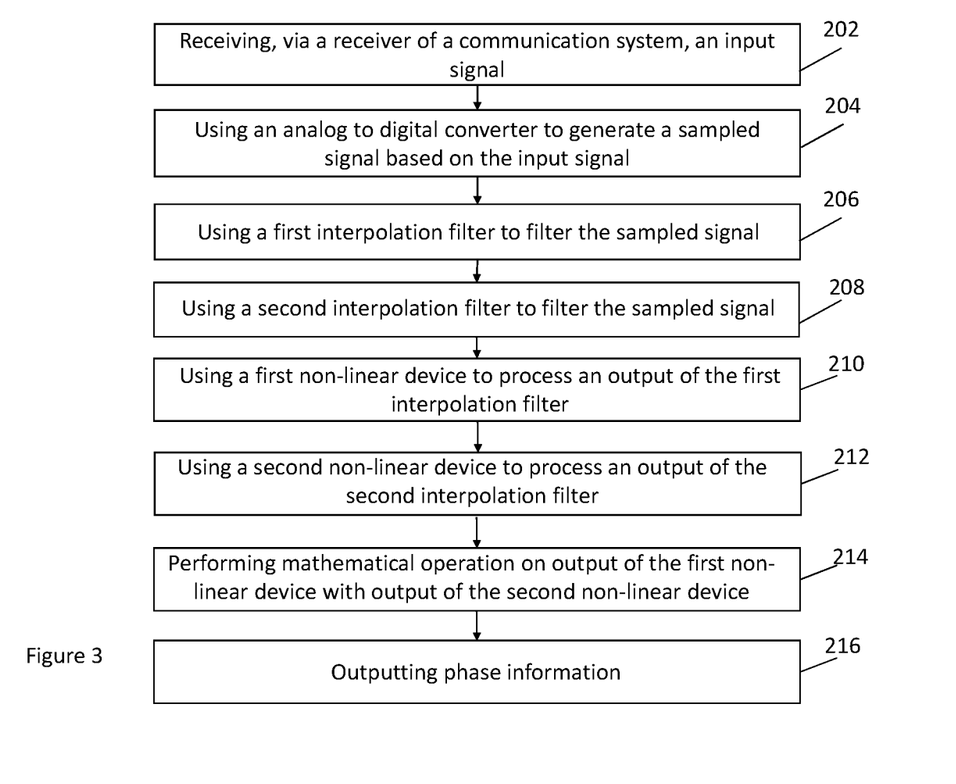
FIG. 3 is a flowchart illustrating an example method of operation of a phase detector embedded in a receiver according to example embodiments of the present invention.
Figure 6:
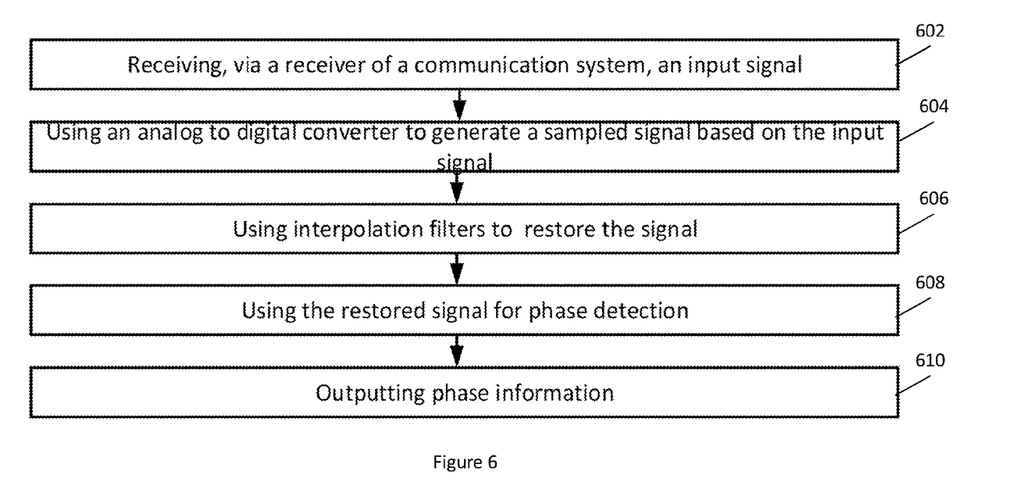
FIG. 6 is a flowchart illustrating a general method of operation of a phase detector embedded in a receiver in the embodiments of the present invention.

FIG. 3 is a flowchart illustrating an example method of operation of a phase detector embedded in a receiver according to example embodiments of the present invention. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 3 may, for example, be performed by the phase detector 120 illustrated in FIG. 2 and FIG. 7. FIG. 6 is a flowchart illustrating a general method of operation of a phase detector embedded in a receiver in the embodiments of the present invention.

In some embodiments, at operation 202, the phase detector receives, via the receiver, an input signal. The input signal encodes information in a plurality of bits. In some embodiments, the input signal is a PAM signal, QAM signal, or other signals. In some embodiments, the input signal is an NRZ signal.

In some embodiments, at operation 204, the phase detector uses an analog to digital converter to generate a sampled signal based on the input signal. In some embodiments, the analog to digital converter is the analog to digital converter 104 previously described in conjunction with FIG. 2. In some embodiments, the analog to digital converter may take the input clock from a numerical control oscillator. In some embodiments, the analog to digital converter may take the input clock from a constant clock generator such as a constant clock generator illustrated in FIG. 7 and may change the sampling phase using a digital interpolator.

In some embodiments, at operation 206, the phase detector uses a first interpolation filter to filter the sampled signal. In some embodiments, the first interpolation filter is the first interpolation filter 106A previously described in conjunction with FIG. 2.

In some embodiments, at operation 208, the phase detector uses a second interpolation filter to filter the sampled signal. In some embodiments, the second interpolation filter is the second interpolation filter 106B previously described in conjunction with FIG. 2. In some embodiments, the first and the second interpolation filters are finite impulse response filters. In some embodiments, the first and the second interpolation filters are infinite impulse response filters. In some embodiments, the number of taps, and other parameters, associated with the first and the second interpolation filters may be configured differently in different embodiments. In some embodiments, the first and the second interpolation filters are four taps filters.

In some embodiments, at operation 210, the communication system uses a first non-linear device to process an output of the first interpolation filter. In some embodiments, the first non-linear device is the first non-linear device 108A previously described in conjunction with FIG. 2.

In some embodiments, at operation 212, the phase detector uses a second non-linear device to process an output of the second interpolation filter. In some embodiments, the second non-linear device is the second non-linear device 108B previously described in conjunction with FIG. 2. In some embodiments, the first and second nonlinear devices may be configured to generate absolute values of their respective inputs. In some embodiments, the first and second nonlinear devices may be configured to generate square roots of their respective inputs. Other operations may also be performed by the nonlinear devices.

In some embodiments, at operation 214, the phase detector uses a mathematical operation performing module to perform a mathematical operation on the output of the first non-linear device with the output of the second non-linear device to generate phase information. In some embodiments, the mathematical operation performing module is the mathematical operation performing module 110 previously described in conjunction with FIG. 2.

In some embodiments, at operation 216, the phase detector outputs the phase information, such as to a loop filter 114 previously described in conjunction with FIG. 2.

The communication system may use the loop filter to filter the phase information and may then use a numerical control oscillator to generate the waveform to be fed into the analog to digital converter based on an output of the loop filter.

Figure 4:
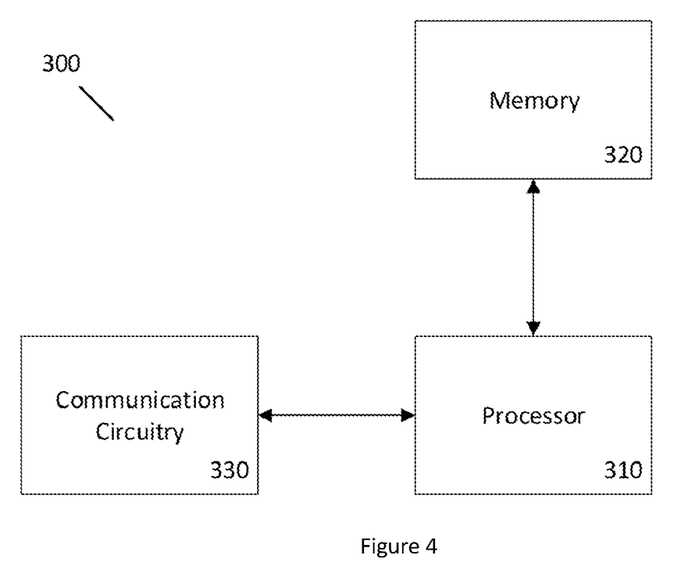
FIG. 4 illustrates an example computing system that may be embedded in the communication system; in some embodiments, the communication system uses hardwire digital logic and doesn't make use of processor.

FIG. 4 illustrates an example computing system 300 that may be embedded in the communication system. The computing system 300 may be used for performing calculations related to calibrating the equalizer embedded in the receiver. The computing system 300 may include or otherwise be in communication with a processor 310, a memory circuitry 320, and communication circuitry 330. In some embodiments, the processor 310 (which may include multiple or co-processors or any other processing circuitry associated with the processor) may be in communication with the memory circuitry 320. The memory circuitry 320 may comprise non-transitory memory circuitry and may include one or more volatile and/or non-volatile memories. In some examples, the memory circuitry 320 may be an electronic storage device (e.g., a computer readable storage medium) configured to store data that may be retrievable by the processor 310. In some examples, the data stored in the memory 320 may include a calibration signal, a set of condition flags and statistics derived based on the condition flags, or the like for enabling the apparatus to carry out various functions or methods in accordance with embodiments of the present invention, described herein.

In some examples, the processor 310 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 310 may also be embodied in various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading. In some embodiments, the processor 310 is a microprocessor.

In an example embodiment, the processor 310 may be configured to execute instructions, such as computer program code or instructions, stored in the memory circuitry 320 or otherwise accessible to the processor 310. Alternatively or additionally, the processor 310 may be configured to execute hard-coded functionality. As such, whether configured by hardware or software instructions, or by a combination thereof, the processor 310 may represent a computing entity (e.g., physically embodied in circuitry) configured to perform operations according to an embodiment of the present invention described herein. For example, when the processor 310 is embodied as an ASIC, FPGA, or similar, the processor may be configured as hardware for conducting the operations of an embodiment of the invention. Alternatively, when the processor 310 is embodied to execute software or computer program instructions, the instructions may specifically configure the processor 310 to perform the algorithms and/or operations described herein when the instructions are executed. However, in some cases, the processor 310 may be a processor of a device (e.g., a mobile terminal or a fixed computing device) specifically configured to employ an embodiment of the present invention by further configuration of the processor by instructions for performing the algorithms and/or operations described herein. The processor 310 may further include a clock, an arithmetic logic unit (ALU) and logic gates configured to support operation of the processor 310, among other things.

The computing system 300 may optionally also include the communication circuitry 330. The communication circuitry may be any means embodied in either hardware or a combination of hardware and software that is configured to receive and/or transmit data from/to a network and/or any other device or module in communication with the computing system 300. In this regard, the communication interface may include, for example, supporting hardware and/or software for enabling communications. As such, for example, the communication circuitry 330 may include a communication modem and/or other hardware/software for supporting communication via cable, universal serial bus (USB), integrated circuit receiver, or other mechanisms.

Figure 5:
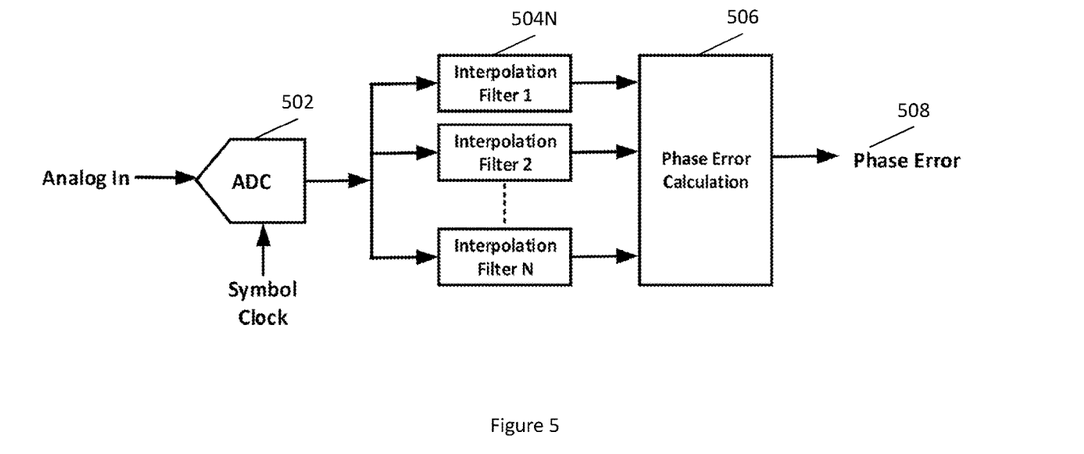
FIG. 5 shows a general block diagram of a timing recovery system in a receiver of a communication system according to the present invention.

FIG. 5 shows a general block diagram of a phase detector in a timing recovery system in a receiver of a communication system according to the present invention. As illustrated in FIG. 5, the timing recovery system includes an analog to digital converter 502 that is configured to receive an analog input signal. The timing recovery system further includes a set of interpolation filters 504N. The output of the interpolation filters may be used for phase error calculation using a phase error calculation module 506, which is configured to output the phase error 508.

FIG. 6 is a flowchart illustrating a general method of operation of a phase detector embedded in a receiver in the embodiments of the present invention. In some embodiments, at operation 602, the phase detector receives, via the receiver, an input signal. The input signal encodes information in a plurality of bits. In some embodiments, the input signal is a PAM signal, a QAM signal or other. In some embodiments, the input signal is an NRZ signal.

In some embodiments, at operation 604, the phase detector uses an analog to digital converter to generate a sampled signal based on the input signal. In some embodiments, the analog to digital converter is the analog to digital converter 104 previously described in conjunction with FIG. 2. In some embodiments, the analog to digital converter may take input clock from a numerical control oscillator. The analog to digital converter may generate the sampled signal based on a constant sampling rate input clock.

In some embodiments, at operation 606, the phase detector uses one or more interpolation filters to restore the input signal in one or more sampling points to generate a restored signal. The one or more interpolation filters may be the interpolation filters 504N illustrated in FIG. 5.

In some embodiments, at operation 608, the phase detector uses the restored signal to determine phase information based on the restored sampling points and original sampling points. The phase detector may be one or more of the various phase detectors described herein.

In some embodiments, at operation 610, the phase detector outputs the phase information for further processing to recover the timing phase.

Figure 7:
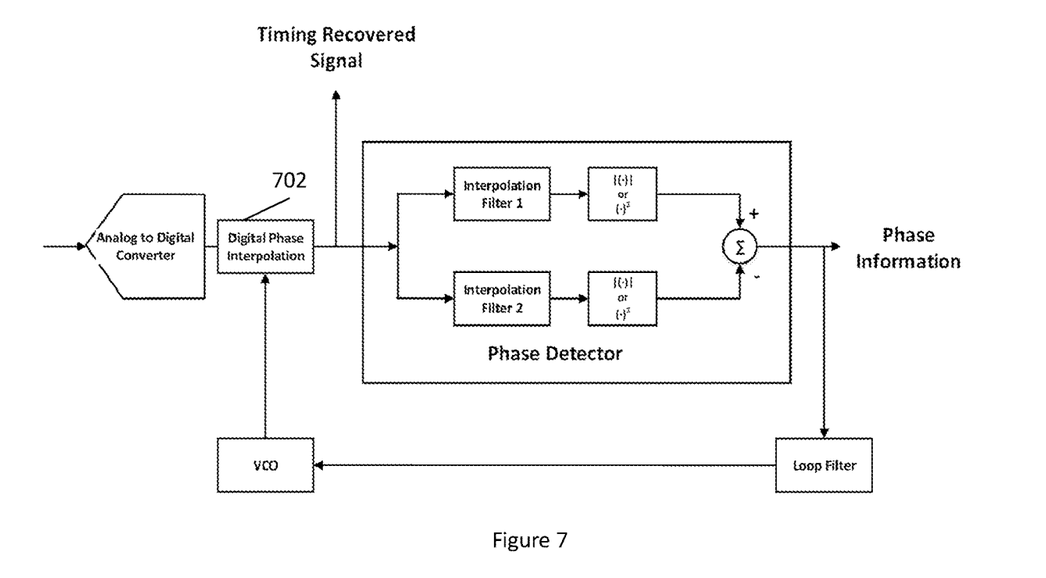
FIG. 7 shows another block diagram of a timing recovery system with a phase detector in a receiver of a communication system according to example embodiments of the present invention.

FIG. 7 shows another block diagram of a timing recovery system with a phase detector in a receiver of a communication system according to example embodiments of the present invention. As illustrated in FIG. 7, the output of the analog to digital converter may be processed by digital phase interpolation operation 702 by utilizing one or more digital phase interpolator before being fed into the phase detector. The phase detector may be the phase detector illustrated in FIG. 2 or FIG. 5.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for timing recovery used in conjunction with a phase detector embedded in a receiver of a communication system, comprising:
receiving, via a receiver of a communication system, an input signal, wherein the input signal encodes a plurality of bits in a number of amplitude levels;
using an analog to digital converter to generate a sampled signal based on the input signal, wherein the analog to digital converter is configured to receive the input signal and a waveform from a numerical control oscillator;
providing the sampled signal to at least a first interpolation filter and a second interpolation filter of a set of interpolation filters to restore the input signal in one or more sampling points to generate a restored signal, wherein a first configuration of the first interpolation filter is different from a second configuration of the second interpolation filter;
determining phase information of the input signal by using a phase detector on the sampled signal and the restored signal based on one or more original sampling points of the analog to digital converter and the one or more sampling points; and
outputting the phase information for further processing to recover a timing phase of the input signal.

2. A method for timing recovery used in conjunction with a phase detector embedded in a receiver of a communication system, comprising:
receiving, via a receiver of a communication system, an input signal, wherein the input signal encodes a plurality of bits in a number of amplitude levels;
using an analog to digital converter to generate a sampled signal based on the input signal, wherein the analog to digital converter is configured to receive the input signal and a waveform from a numerical control oscillator;
providing the sampled signal to at least a first interpolation filter and a second interpolation filter of a set of interpolation filters, wherein a first configuration of the first interpolation filter is different from a second configuration of the second interpolation filter;
using the first interpolation filter to filter the sampled signal;
using the second interpolation filter to filter the sampled signal;
using a first non-linear device to process an output of the first interpolation filter;
using a second non-linear device to process an output of the second interpolation filter;
performing a mathematical operation on an output of the first non-linear device with an output of the second non-linear device to generate phase information; and
outputting the phase information for further processing to generate the waveform.

3. The method of claim 2, wherein the input signal is one of a pulse amplitude modulation signal, a quadrature amplitude modulation signal, or another type of signal encoding the plurality of symbols in four amplitude levels.

4. The method of claim 2, wherein the first interpolation filter is a first finite impulse response filter associated with a first number of taps, and wherein the second interpolation filter is a second finite impulse response filter associated with a second number of taps.

5. The method of claim 2, wherein the first interpolation filter is a first infinite impulse response filter associated with a first number of taps, and wherein the second interpolation filter is a second infinite impulse response filter associated with a second number of taps.

6. The method of claim 2, wherein the input signal is a previously sampled signal previously sampled from an original signal at a pre-defined symbol rate.

7. The method of claim 2, wherein the first non-linear device is configured to calculate a first absolute value, and wherein the second non-linear device is configured to calculate a second absolute value.

8. The method of claim 2, wherein the first non-linear device is configured to calculate a first square root, and wherein the second non-linear device is configured to calculate a second square root.

9. The method of claim 2, wherein the mathematical operation is one of: a subtraction operation or an interpolation operation.

10. An apparatus for timing recovery used in conjunction with a phase detector embedded in a receiver of a communication system, comprising:
   a receiver of a communication system configured to receive an input signal;
   an analog to digital converter configured to generate a sampled signal based on the input signal, receive a waveform from a numerical control oscillator, and provide the sampled signal to at least a first interpolation filter and a second interpolation filter of a set of interpolation filters, wherein the first interpolation filter is configured to filter the sampled signal, wherein the second interpolation filter is configured to filter the sampled signal, and wherein a first configuration of the first interpolation filter is different from a second configuration of the second interpolation filter;
   a first non-linear device configured to process an output of the first interpolation filter;
   a second non-linear device configured to process an output of the second interpolation filter; and
   a mathematical operation performing module configured to perform a mathematical operation on an output of the first non-linear device with the output of the second non-linear device to generate phase information for further processing to generate the waveform.

11. The apparatus of claim 10, further comprising:
   a loop filter configured to filter the phase information, wherein the numerical control oscillator is configured to generate the waveform based on an output of the loop filter.

12. The apparatus of claim 10, wherein the input signal is a pulse amplitude modulation signal encoding a plurality of symbols in four amplitude levels.

13. The apparatus of claim 10, wherein the first interpolation filter is associated with a first number of taps, and wherein the second interpolation filter is associated with a second number of taps.

14. The apparatus of claim 12, wherein the first interpolation filter is a first infinite impulse response filter associated with a first number of taps, and wherein the second interpolation filter is a second infinite impulse response filter associated with a second number of taps.

15. The apparatus of claim 10, wherein the input signal is a previously sampled signal previously sampled from an original signal at a pre-defined symbol rate.

16. The apparatus of claim 10, wherein the first non-linear device is configured to calculate a first absolute value, and wherein the second non-linear device is configured to calculate a second absolute value.

17. The apparatus of claim 10, wherein the first non-linear device is configured to calculate a first square root, and wherein the second non-linear device is configured to calculate a second square root.

18. The apparatus of claim 10, wherein the mathematical operation is one of: a subtraction operation or an interpolation operation.

19. The method of claim 2, wherein the first non-linear device is configured to calculate a first absolute value, and wherein the second non-linear device is configured to calculate a second absolute value.

20. The method of claim 2, wherein the first non-linear device is configured to calculate a first square root, and wherein the second non-linear device is configured to calculate a second square root.

* * * * *